US009689622B2

(12) United States Patent
Uno et al.

(10) Patent No.: US 9,689,622 B2
(45) Date of Patent: Jun. 27, 2017

(54) HEAT TRANSFER DEVICE

(75) Inventors: Junichi Uno, Chuo-ku (JP); Hisaaki Yamakage, Chuo-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 443 days.

(21) Appl. No.: 14/395,734

(22) PCT Filed: Apr. 25, 2012

(86) PCT No.: PCT/JP2012/061023
§ 371 (c)(1),
(2), (4) Date: Oct. 20, 2014

(87) PCT Pub. No.: WO2013/161013
PCT Pub. Date: Oct. 31, 2013

(65) Prior Publication Data
US 2015/0075753 A1    Mar. 19, 2015

(51) Int. Cl.
*F22B 1/02* (2006.01)
*F28D 15/02* (2006.01)
(Continued)

(52) U.S. Cl.
CPC ............ *F28D 15/02* (2013.01); *F16L 53/001* (2013.01); *F24H 1/12* (2013.01); *F28D 15/0275* (2013.01)

(58) Field of Classification Search
CPC  F28D 15/0275; F28D 15/0233; F16L 53/002; F16L 53/005
(Continued)

(56) References Cited

U.S. PATENT DOCUMENTS 3,651,240 A  *  3/1972  Kirkpatrick ............. F27D 11/02
                                                    118/715
3,948,316 A  *  4/1976  Souriau ................. F28D 15/043
                                                    122/366
(Continued)

FOREIGN PATENT DOCUMENTS

JP       2003-278983      10/2003
JP       2005-214403       8/2005
(Continued)

OTHER PUBLICATIONS

International Search Report Issued May 29, 2012 in PCT/JP12/061023 Filed Apr. 25, 2012.
(Continued)

*Primary Examiner* — Gregory A Wilson
(74) *Attorney, Agent, or Firm* — Oblon, McClelland, Maier & Neustadt, L.L.P.

(57) ABSTRACT

A heat transfer device that can improve temperature uniformity along the entire length of a pipe line housed in the heat transfer device is provided. The heat transfer device transferring heat to the pipe line in which a fluid flows includes: a heat transfer block of high heat conductivity, surrounding the pipe line, a heat pipe formed in the heat transfer block, along an extending direction of the pipe line, and a heater applying heat to the heat pipe. The heat transfer block includes a plurality of divided blocks dividable along the extending direction of the pipe line. There is provided a proximity portion where the heat transfer block is in proximate to the pipe line at both ends of the heat transfer block in the extending direction of the pipe line.

14 Claims, 12 Drawing Sheets

(51) Int. Cl.
*F24H 1/12* (2006.01)
*F16L 53/00* (2006.01)

(58) Field of Classification Search
USPC .............. 122/195, 366, 367.1; 165/104.21, 165/104.23, 104.26
See application file for complete search history.

(56) References Cited

U.S. PATENT DOCUMENTS

| | | | | |
|---|---|---|---|---|
| 3,952,798 | A * | 4/1976 | Jacobson | F28D 15/0233 122/366 |
| 4,017,102 | A | 4/1977 | Henderson | |
| 4,825,814 | A * | 5/1989 | Meijer | F02G 1/055 122/160 |
| 5,555,914 | A * | 9/1996 | Baker | B32B 5/26 122/366 |
| 5,611,394 | A * | 3/1997 | Mizuta | B21B 27/08 165/104.21 |
| 6,167,955 | B1 * | 1/2001 | Van Brocklin | F28D 15/06 165/104.22 |
| 6,827,046 | B2 * | 12/2004 | Welle | B01B 1/005 122/367.1 |
| 6,863,117 | B2 * | 3/2005 | Valenzuela | F28D 15/0233 165/104.21 |
| 7,578,669 | B2 * | 8/2009 | Liu | F23C 13/06 122/367.1 |
| 2002/0043220 | A1 * | 4/2002 | Yao | F28D 15/043 122/366 |
| 2006/0289471 | A1 | 12/2006 | Sasaki et al. | |
| 2009/0178785 | A1 * | 7/2009 | Hassett | F28D 15/0275 165/104.26 |
| 2014/0138058 | A1 * | 5/2014 | Hyde | F28D 15/04 165/104.26 |

FOREIGN PATENT DOCUMENTS

| | | |
|---|---|---|
| JP | 2007-02986 | 1/2007 |
| JP | 2009-521651 | 6/2009 |
| TW | 200624700 | 7/2006 |
| TW | 200716900 | 5/2007 |
| WO | 2010/032304 | 3/2010 |
| WO | 2011/055430 | 5/2011 |

OTHER PUBLICATIONS

Taiwanese Office Action issued Feb. 24, 2013 in Taiwan application 101120233 (with English Translation).
Taiwanese Search Report issued Feb. 14, 2013 in Taiwan application 101120233.

* cited by examiner

HEAT TRANSFER DEVICE

TECHNICAL FIELD

The present invention relates to a heat transfer device, and particularly to a heat transfer device transferring heat isothermally to a pipe line.

BACKGROUND ART

In conventional piping for conveying a fluid, there is the case where the temperature of the fluid transported inside the pipe is controlled by heating the pipe when it is necessary to control the temperature of the fluid with high precision along the entire length of the pipe.

As to the technique of heating the pipe, there is proposed a heat transfer device conventionally including a heat transfer block of high heat conductivity, surrounding the pipe line, a heat pipe embedded in the heat transfer block along the extending direction of the pipe line, and a heater applying heat to the heat pipe, wherein the heat transfer block includes a plurality of divided blocks dividable along the extending direction of the pipe line (for example, refer to WO2011/055430).

CITATION LIST

Patent Document

PTD 1: WO2011/055430

SUMMARY OF INVENTION

Technical Problem

In the heat transfer device disclosed in WO2011/055430 (PTD 1), there may be case where the temperature of the apparatus at the region connected to the heat transfer device becomes lower than the control temperature of the heat transfer device. In such a case, heat transfer from the heat transfer device side to the apparatus side will occur via the cross section of the pipe to cause temperature distribution at the pipe from the end portion to the inner side of the heat transfer device. This leads to a shorter uniform temperature range at the pipe inside the heat transfer device. Therefore, temperature uniformity with high precision cannot be maintained along the entire length of the pipe line housed in the heat transfer device.

Since the piping section for connection between the heat transfer device and the apparatus joining the heat transfer device is so short that the heating and temperature control cannot be effected readily, the surface of the pipe is usually treated with a heat insulating material to maintain the temperature. In this case, heat will be dissipated from the end of the pipe located in the heat transfer device to the outside air through the cross section of the pipe and the heat insulating material. Therefore, even if the temperature of the apparatus is equal to the control temperature of the heat transfer device, the pipe temperature will be decreased at the end side of the pipe located in the heat transfer device. Thus, temperature uniformity with high precision cannot be maintained along the entire length of the pipe.

The conventional heat transfer device had the problem of being vulnerable to the effect of heat dissipation from the joining portion with the apparatus, and the effect of temperature distribution at the joining apparatus side.

In view of the foregoing, a main object of the present invention is to provide a heat transfer device that can improve temperature uniformity along the entire length of the pipe line.

Solution to Problem

The inventors of the present invention studied diligently into the reason why temperature uniformity cannot be maintained at the pipe housed in a conventional heat transfer device. They found that the gap between the pipe line and the heat transfer block, provided for the sake of facilitating assembly thereof, is also present at the end portion of the heat transfer device, so that the effect of heat dissipated from the end of the pipe to the outside air and heat transfer towards the apparatus side joining with the pipe end is greater than the heating effect from the heat transfer block to the pipe. In view of the foregoing, the inventors established the configuration of the present invention as set forth below.

A heat transfer device according to the present invention is directed to transferring heat to a pipe line in which a fluid flows, including a heat transfer block of high heat conductivity, surrounding the pipe line, a heat pipe formed in the heat transfer block, along an extending direction of the pipe line, and a heater applying heat to the heat pipe. The heat transfer block includes a plurality of divided blocks dividable along the extending direction of the pipe line. There is provided a proximity portion where the heat transfer block is in proximity to the pipe line at both ends of the heat transfer block in the extending direction of the pipe line.

Preferably in the aforementioned heat transfer device, the extending length of the proximity portion in the extending direction of the pipe line is less than or equal to the outer diameter of the pipe line at the proximity portion.

Preferably in the aforementioned heat transfer device, the heat transfer block includes a first divided block and a second divided block. The heat pipe is formed at only the first divided block, among the plurality of divided blocks. The first divided block and the second divided block are in surface contact.

Preferably in the aforementioned heat transfer device, the heat transfer block includes an intermediate member between the divided block and the pipe line, at the proximity portion to the pipe line. The intermediate member is in thermal contact with the divided block. Preferably, a small gap is provided between the intermediate member and the pipe line.

Preferably in the aforementioned heat transfer device, the proximity portion is formed by reducing the inner diameter of the divided block end at the proximity portion. Preferably, a small gap is provided between the divided block and the pipe line at the proximity portion.

The aforementioned heat transfer device preferably includes a biasing member pushing the pipe line at the proximity portion towards the first divided block side. The heat transfer device preferably includes a sphere attached to the leading end of the biasing member. The sphere is in contact with the outer circumferential face of the pipe line.

Preferably in the aforementioned heat transfer device, the heat transfer block includes a first divided block and a second divided block. The first divided block faces the second divided block with a small gap therebetween.

Preferably in the aforementioned heat transfer device, the heat transfer block includes an intermediate member between the divided block and the pipe line, at the proximity portion. The intermediate member is in thermal contact with the divided block. Preferably, the intermediate member is in contact with the pipe line.

Preferably in the aforementioned heat transfer device, the proximity portion is formed by reducing the inner diameter of the divided block at the proximity portion. Preferably, the divided block is in contact with the pipe line at the proximity portion.

Advantageous Effects of Invention

According to the heat transfer device of the present invention, the temperature uniformity can be improved along the entire length of the pipe line.

DESCRIPTION OF EMBODIMENTS

Figure 1:
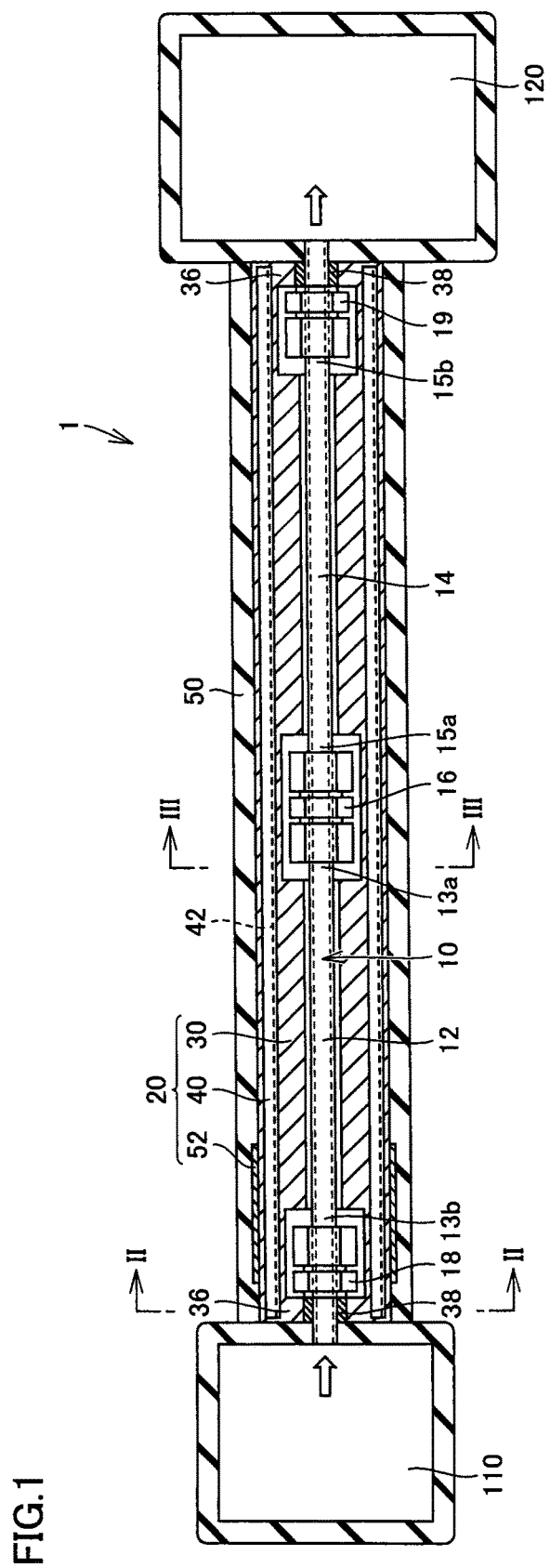
FIG. 1 is a schematic diagram representing a configuration of a heat transfer device according to a first embodiment.

Embodiments of the present invention will be described hereinafter with reference to the drawings. In the drawings, the same or corresponding elements have the same reference characters allotted, and description thereof will not be repeated.

First Embodiment

Figure 2:
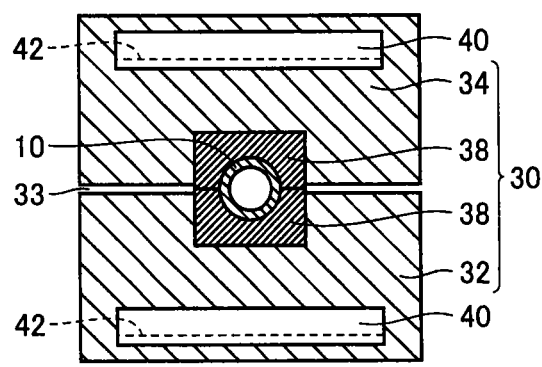
FIG. 2 is a sectional view of the heat transfer device taken along line II-II in FIG. 1.
Figure 3:
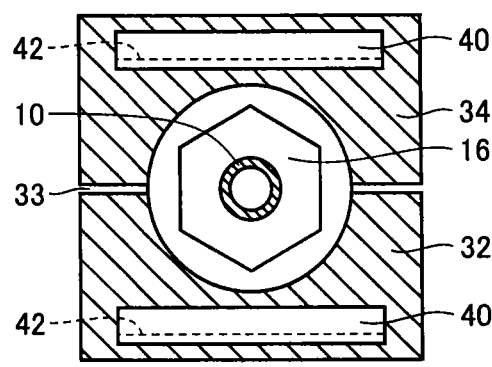
FIG. 3 is a sectional view of the heat transfer device taken along line in FIG. 1.

FIG. 1 is a schematic diagram representing a configuration of a heat transfer device 20 according to a first embodiment. FIG. 2 is a sectional view of heat transfer device 20 taken along line II-II in FIG. 1. FIG. 3 is a sectional view of heat transfer device 20 taken along line in FIG. 1. In FIG. 1, a partially cut side view of a fluid conveying device 1 employing heat transfer device 20 of the present embodiment is shown.

As shown in FIG. 1, fluid conveying device 1 includes two apparatuses 110 and 120, and a pipe line 10 connecting apparatuses 110 and 120. Fluid conveying device 1 functions to convey a fluid from one apparatus 110 to the other apparatus 120 via pipe line 10, as shown by the open arrow in FIG. 1. Pipe line 10 includes a first pipe 12 and a second pipe 14. First pipe 12 has one end 13a and the other end 13b. Second pipe 14 has one end 15a and the other end 15b. Pipe line 10 also includes a connector 16 connecting one end 13a of first pipe 12 and one end 15a of second pipe 14, a connector 18 connecting apparatus 110 and the other end 13b of first pipe 12, and a connector 19 connecting the other end 15b of second pipe 14 and apparatus 120.

Fluid conveying device 1 includes heat transfer device 20. Heat transfer device 20 transfers heat isothermally to pipe line 10 to heat the fluid flowing inside pipe line 10 isothermally via pipe line 10. Heat transfer device 20 includes a heat transfer block 30 surrounding pipe line 10, a heat pipe 40 formed in heat transfer block 30 along the extending direction of pipe line 10, and a heater 52 as an example of the heater applying heat to heat pipe 40.

As used herein, pipe line 10 is based on the concept of including a pipe through which a fluid flows, and piping accessories connected to the relevant pipe, and refers to an assembly of mutually connected pipes including piping accessories. A pipe is not limited to a straight pipe, and may include a bending pipe bent in an arbitrary shape. Furthermore, a pipe is not limited to an unbendable pipe, and may include a bendable pipe such as a flexible tube. As piping accessories, a joint such as an elbow or tee, a valve, strainer, and nozzle can be cited. Moreover, various apparatuses connected in communication with a pipe such as a tank for storing a fluid, a vaporizer for heating and vaporizing fluid, a reaction chamber to which a gaseous material is supplied to cause a predetermined reaction for forming a film onto the surface of a substrate or the like may be included in pipe line 10.

Heat pipe 40 is a hollow portion formed in heat transfer block 30. This hollow portion is a sealed vacuum space reduced in pressure by evacuation. At the inner face of the hollow portion, a wick 42 formed of a porous material having capillary force may be provided. As wick 42, a metal net or sintered metal may be mounted on the inner surface of the hollow portion, or fine grooves may be formed on the inner surface.

Heat pipe 40 also includes working fluid remaining in the hollow portion. The working fluid is heated to evaporate, and is condensed by heat dissipation (condensation property). By charging an appropriate amount of this condensable working fluid into the hollow portion that is sealed space of reduced pressure in vacuum, heat pipe 40 can be formed. Heat pipe 40 functions to cause the working fluid to be heated and vaporized at the high temperature region where heater 52 is arranged to move inside the hollow portion such that the working fluid is condensed at the wall face of the low temperature region in the hollow portion where the temperature is relatively low to release latent heat. Thus the hollow portion is heated isothermally. The condensed working fluid is circulated to the high temperature region by the capillarity of wick 42. By repetition thereof, heat transportation is conducted from the high temperature region to the low temperature region.

Heat pipe 40 is not limited to the aforementioned wick type, and may be the thermosiphon type heat pipe taking advantage of gravity. Alternatively, it may be a loop heat pipe in which a two-phase condensable working fluid is sealed inside a loop type narrow tubule.

Heat pipe 40 extends from the other end 13b of first pipe 12 up to the other end 15b of second pipe 14. As shown in FIG. 1, heat pipe 40 is formed inside heat transfer block 30 along the extending direction of pipe line 10, from the region of heat transfer block 30 surrounding connector 18 connected to the other end 13b of first pipe 12 up to the region of heat transfer block 30 surrounding connector 19 connected to the other end 15b of second pipe 14. Heat pipe 40 surrounds the entirety of first pipe 12, second pipe 14, and connector 16 in the extending direction.

For heater 52 that heats heat pipe 40 to cause the working fluid to vaporize, an arbitrary heat source can be employed. Typically, an electric heater, a heat-medium-circulation-type heater, or a heater of an induction heating method is applicable, for example.

Heater 52 is in thermal contact with heat transfer block 30 so as to heat the side of heat pipe 40 in proximity to apparatus 110. Heater 52 forms contact with the outer circumferential face of heat transfer block 30. Heater 52 is to be brought into thermal contact with heat transfer block 30 so as to allow heat to be transferred to heat pipe 40 via heat transfer block 30, and may be configured to form contact with the outer surface of heat transfer block 30, or have heater 52 incorporated inside heat transfer block 30. Since the entirety of heat pipe 40 can be heated as long as heater 52 heats one arbitrary region of heat pipe 40, the arrangement of heater 52 is not limited the location shown in FIG. 1 in proximity to apparatus 110.

As used herein, "thermal contact" refers to the state where the heat transfer efficiency of heat being transferred directly is sufficiently high, between heat transfer block 30 and heater 52. The state is not limited to the relevant members being brought into direct mechanical contact by abutting against each other. For example, the state where heater 52 is united with heat transfer block 30 by brazing, welding or the like, or the state where indirect contact is established with a substance of high heat conductivity therebetween may be included in the thermal contact state.

The entirety of the device from apparatus 110 through first pipe 12, second pipe 14 up to apparatus 120 is externally covered with a heat insulating material 50. Heat insulating material 50 serves to suppress heat transfer between fluid conveying device 1 and the environment. Accordingly, a configuration is provided in which re-liquefaction of the evaporated fluid flowing pipe line 10 is suppressed, and the energy loss reduced. Heat insulating material 50 is arbitrary as long as the heat conductivity is low to serve as a barrier to suppress heat conduction, and may be formed of a material of high porosity in a solid such as glass wool or polystyrene foam.

As shown in FIGS. 2 and 3, heat transfer block 30 covering pipe line 10 includes a plurality of divided blocks 32 and 34. Pipe line 10 is surrounded by divided-type heat transfer block 30. Heat transfer block 30 is formed in a dividable manner along the extending direction of pipe line 10 (that is, the horizontal direction in FIG. 1, and the direction perpendicular to the drawing sheet in FIGS. 2 and 3).

Specifically, heat transfer block 30 includes a first divided block 32 and a second divided block 34 in the present embodiment. The combination of first divided block 32 and a second divided block 34 causes provision of a hollow cylindrical heat transfer block 30 having a hollow tubular space formed inside. A hollow portion is formed inside divided blocks 32 and 34 to allow provision of heat pipe 40.

The shape of the divided blocks constituting heat transfer block 30 is not limited to the cross section shape shown in FIGS. 2 and 3, and the number of the divided blocks is not limited to two. Although heat transfer block 30 may be formed of divided blocks having an arbitrary shape and in arbitrary numbers, a combination of divided blocks of the same shape is desirable for heat transfer block 30 since the productivity can be improved.

Divided blocks 32 and 34 are formed of a material of high heat conductivity typical of a metal material such as aluminum or copper. Aluminum-made divided blocks 32 and 34 are desirable from the standpoint of reducing weight. Moreover, the surface of divided blocks 32 and 34 facing pipe line 10 is preferably alumite-treated to improve the heat transfer efficiency by radiation. Copper-made divided blocks 32 and 34 are desirable from the standpoint of further improving the heat conductivity as well as allowing the usage of water that has favorable thermal property as the working fluid in heat pipe 40.

As shown in FIGS. 1 and 2, an intermediate member 38 located between divided blocks 32 and 34 and pipe line 10 is provided at both ends of heat transfer block 30 in the extending direction of pipe line 10. Heat transfer block 30 includes intermediate member 38 located between the inner circumferential face of first divided block 32 and the outer circumferential face of pipe line 10, and also intermediate member 38 located between the inner circumferential face of second divided block 34 and the outer circumferential face of pipe line 10. Intermediate member 38 forms surface contact with pipe line 10.

The provision of intermediate member 38 causes heat transfer block 30 to be in proximity to pipe line 10 at either end of pipe line 10 in the extending direction. There is provided a proximity portion 36 where heat transfer block 30 and pipe line 10 are adjacent to each other at either end of heat transfer block 30 in the extending direction of pipe line 10. The distance between heat transfer block 30 and pipe line 10 at proximity portion 36 is smaller than the distance between heat transfer block 30 and pipe line 10 at other regions than proximity portion 36. In the first embodiment, intermediate member 38 of heat transfer block 30 and pipe line 10 form surface contact at proximity portion 36.

Intermediate member 38 also forms surface contact with divided blocks 32 and 34. Among the pair of intermediate members 38, 38, intermediate member 38 at the side of first divided block 32 (intermediate member 38 at the lower side in FIGS. 1 and 2) is in contact with first divided block 32, and forms thermal contact with first divided block 32. Intermediate member 38 at the side of second divided block 34 (intermediate member 38 at the upper side in FIGS. 1 and 2) is in contact with second divided block 34, and forms thermal contact with second divided block 34.

The pair of intermediate member 38, 38 forms surface contact with each other. First divided block 32 and second divided block 34 face each other with small gap 33 therebetween. Since small gap 33 is located between divided blocks 32 and 34, the mutual surface contact between intermediate members 38 will not be impeded by the mutual abutment of divided blocks 32 and 34. In the configuration in which one intermediate member 38 is formed integrally with first divided block 32 and the other intermediate member 38 is formed integrally with second divided block 34, heat transfer block 30 is attached to the circumference of pipe line 10 so as to set first divided block 32 and second divided block 34 in proximity with each other.

Thus, the configuration in which the pair of intermediate members 38 form surface contact with each other, intermediate member 38 forms surface contact with pipe line 10, and intermediate member 38 forms thermal contact with divided blocks 32 and 34 can be achieved reliably. Since divided blocks 32 and 34 each include heat pipe 40 and heater 52 for each temperature control, it is considered that small gap 33 located between divided blocks 32 and 34 has substantially no effect on the temperature of pipe line 10. This is due to heat transfer block 30 being set at uniform temperature along its entirety by heat pipe 40, and heat transfer block 30 surrounded by heat insulating material 50.

Intermediate member 38 is formed of a material of high heat conductivity. Intermediate member 38 may be formed of a material different from that of divided blocks 32 and 34.

By forming proximity portion 36 as set forth above, the heat of heat transfer block 30 maintained at uniform temperature by heat pipe 40 can be transferred to pipe line 10 at proximity portion 36, allowing heat to be transferred to pipe line 10 intentionally from heat transfer block 30 at both ends of heat transfer device 20. By the thermal contact between pipe line 10 and heat transfer block 30 at proximity portion 36, the amount of heat transferred from heat transfer block 30 towards pipe line 10 at the end of heat transfer device 20 is increased. Accordingly, the amount of heat dissipation towards the surrounding air at the joining region of heat transfer device 20 with apparatuses 110 and 120 and the amount of heat transfer towards the side of apparatuses 110 and 120 can be compensated for thermally.

Thus, the heat dissipated to the surrounding air from the end of pipe line 10 housed in heat transfer device 20 via the cross section of the pipe and heat insulating material 50 can be compensated for by the heat transfer from heat transfer block 30 via proximity portion 36, suppressing the temperature reduction at pipe line 10 caused by heat dissipation at the joining region of heat transfer device 20 with apparatuses 110 and 120. Moreover, even in the case where the temperature of the region of apparatuses 110 and 120 connected with heat transfer device 20 is lower than the control temperature of heat transfer device 20, the heat transferred from the side of heat transfer device 20 towards the side of apparatuses 110 and 120 can be compensated for by the transferred heat from heat transfer block 30 via proximity portion 36. Thus, temperature uniformity can be maintained with high precision along the entire length of pipe line 10 housed in heat transfer device 20.

If the extending length of proximity portion 36 in the extending direction of pipe line 10 is too long, there is the inconvenience that pipe line 10 is restrained excessively by proximity portion 36. Therefore, the extending length of proximity portion 36 is preferably less than or equal to the outer diameter dimension of pipe line 10 surrounded by heat transfer block 30 at proximity portion 36. From the standpoint of sufficiently ensuring heat transfer from heat transfer block 30 towards pipe line 10 at proximity portion 36, the extending length of proximity portion 36 in the extending direction of pipe line 10 is preferably greater than or equal to half the outer diameter dimension of at least pipe line 10.

By the configuration of forming heat pipe 40 at heat transfer block 30 in heat transfer device 20 set forth above, heat transfer block 30 is heated automatically to isothermal temperature through the heat transportation capability of heat pipe 40. By providing proximity portion 36 at both ends of heat transfer device 20 at the region connected with apparatuses 110 and 120 to ensure the amount of heat transferred from heat transfer block 30 to pipe line 10 via proximity portion 36, temperature reduction of pipe line 10 at either end of heat transfer device 20 can be suppressed. Therefore, since heat transfer device 20 can transfer heat isothermally to pipe line 10 along the entire length, allowing the entirety of pipe line 10 to be temperature-controlled with high precision, the temperature uniformity along the entire length of pipe line 10 can be improved significantly.

Since heat transfer block 30 is maintained at the uniform set temperature by heat pipe 40, heat uniformity along the entirety of heat transfer block 30 can be ensured by providing proximity portion 36 to have heat transferred to pipe line 10 from heat transfer block 30 at both ends of heat transfer device 20, which in turn allows the uniformity of heat transferred to pipe line 10 to be improved. Moreover, even if a portion of heat transfer block 30 is in contact with pipe line 10, the temperature of pipe line 10 in contact at that region will not exceed the set temperature since heat transfer block 30 is maintained at isothermal temperature. As compared to a heat transfer device that heats the pipe line with a heater, the temperature distribution of pipe line 10 can be reduced. The temperature uniformity can be maintained with high precision along the entire length of pipe line 10 inside heat transfer device 20.

Although pipe line 10 and heat transfer block 30 are brought into contact at proximity portion 36, there is a gap between the inner circumferential face of heat transfer block 30 and the outer surface of pipe line 10 at the remaining areas. Since this gap serves as a tolerance for an error that may occur when assembling heat transfer device 20 around pipe line 10, the assembly of heat transfer device 20 can be improved. As mentioned above, the temperature of pipe line 10 can be maintained uniform even if a portion of heat transfer blocks 30 forms contact with pipe line 10. Therefore, a gap between heat transfer block 30 and pipe line 10 is not necessarily required along all the regions excluding the region of proximity portion 36 located at both ends of heat transfer device 20. A region between heat transfer block 30 and pipe line 10 may be in contact, in addition to the region at either end of heat transfer device 20.

Second Embodiment

Figure 4:
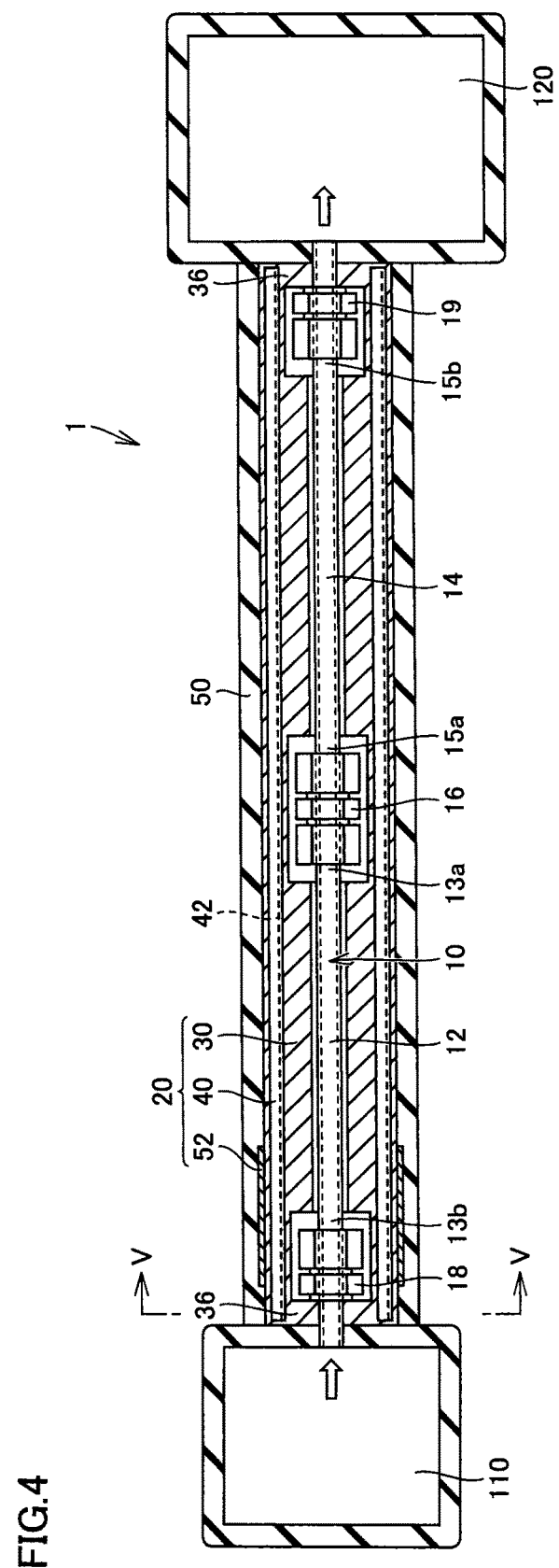
FIG. 4 is a schematic diagram representing a configuration of a heat transfer device according to a second embodiment.
Figure 5:
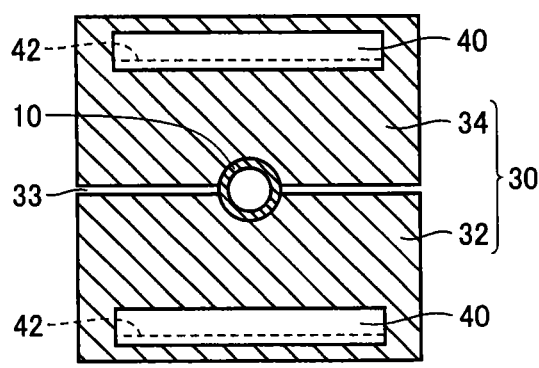
FIG. 5 is a sectional view of the heat transfer device taken along line V-V in FIG. 4.

FIG. 4 is a schematic diagram representing a configuration of heat transfer device 20 according to a second embodiment. FIG. 5 is a sectional view of heat transfer device 20 taken along line V-V in FIG. 4. As shown in FIGS. 4 and 5, heat transfer device 20 of the second embodiment differs from the first embodiment in that intermediate member 38 between divided blocks 32 and 34 and pipe line 10 is absent, and proximity portion 36 is formed by reducing the inner diameter of divided blocks 32 and 34, which form surface contact with pipe line 10 at proximity portion 36.

In the first embodiment with intermediate member 38, thermal contact resistance is generated between divided blocks 32 and 34 and intermediate member 38. In the second embodiment, thermal contact resistance caused by intermediate member 38 is not generated by virtue of forming proximity portion 36 with both ends of divided blocks 32 and 34 in contact with pipe line 10. Accordingly, the heat transfer efficiency from heat transfer block 30 to pipe line 10 via proximity portion 36 is improved, increasing the effect of suppressing temperature reduction of pipe line 10 at both ends of heat transfer block 30. Moreover, the configuration of heat transfer device 20 can be simplified by eliminating intermediate member 38, allowing the cost of heat transfer device 20 to be reduced.

In the case where provision of proximity portion 36 is expected from the beginning of the designing of heat transfer device 20, proximity portion 36 is preferably formed by the formation of divided blocks 32 and 34 per se shown in the second embodiment. However, proximity portion 36 may be formed using intermediate member 38, as in the first embodiment. In this case, proximity portion 36 can be formed by adding intermediate member 38 to the conventional heat transfer device disclosed in WO2011/055430 (PTD 1). Proximity portion 36 can be added as an option to a conventional heat transfer device, allowing the degree of freedom in designing heat transfer device 20 to be improved.

Third Embodiment

Figure 6:
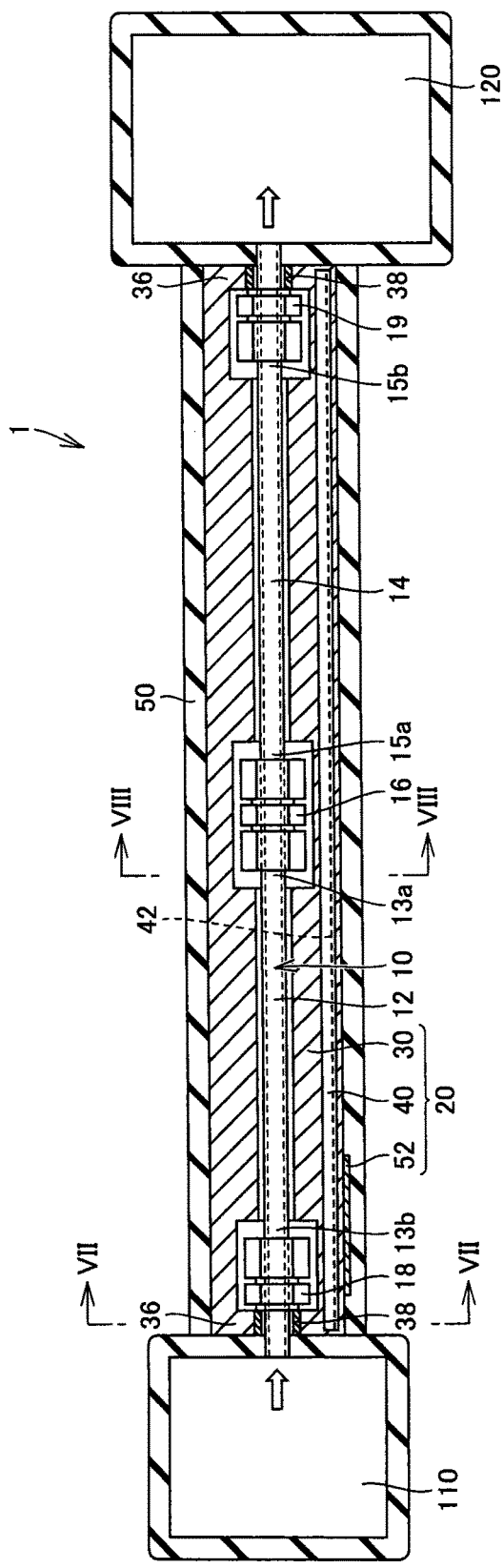
FIG. 6 is a schematic diagram representing a configuration of a heat transfer device according to a third embodiment.
Figure 7:
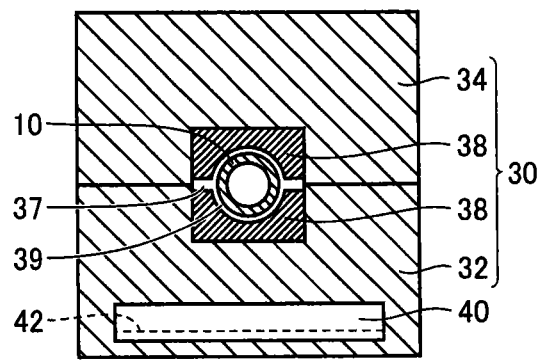
FIG. 7 is a sectional view of the heat transfer device taken along line VII-VII in FIG. 6.
Figure 8:
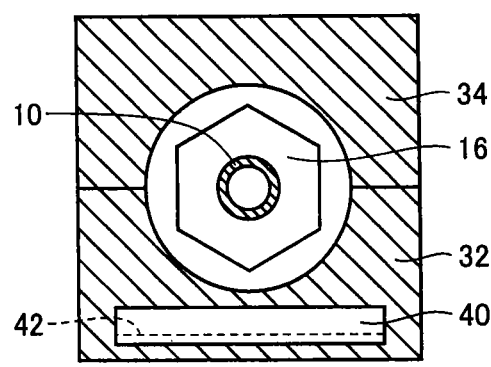
FIG. 8 is a sectional view of the heat transfer device taken along line VIII-VIII in FIG. 6.

FIG. 6 is a schematic diagram representing a configuration of heat transfer device 20 according to a third embodiment. FIG. 7 is a sectional view of heat transfer device 20 taken along line VII-VII in FIG. 6. FIG. 8 is a sectional view of heat transfer device 20 taken along line VIII-VIII in FIG. 6. In heat transfer device 20 of the third embodiment, heat transfer block 30 includes a plurality of divided blocks 32 and 34, and heat pipe 40 is provided at only one of the plurality of divided blocks 32 and 34.

At heat transfer device 20 of the third embodiment shown in FIGS. 6-8, heat transfer block 30 includes a first divided block 32 and a second divided block 34. Heat pipe 40 is provided at only first divided block 32. Among the two divided blocks 32 and 34, a hollow portion is formed in first divided block 32, in which heat pipe 40 is provided. Second divided block 34 has a solid structure, absent of a hollow portion. By providing only one heat pipe 40 and one heater 52 for heating heat pipe 40, the manufacturing cost of heat transfer device 20 can be reduced. Also, the running cost can be reduced since the generated heat of heater 52 can be decreased.

In order to ensure heat transfer from first divided block 32 having heat pipe 40 formed towards second divided block 34 absent of heat pipe 40, thermal contact is established between first divided block 32 and second divided block 34. First divided block 32 and second divided block 34 may be brought in direct surface contact as shown in FIGS. 7-8, or may be brought in contact with a material of high heat conductivity therebetween. For the purpose of ensuring the contact of divided blocks 32 and 34, a member that biases divided blocks 32 and 34 in a direction closer to each other may be provided.

Likewise with the first embodiment, the provision of intermediate member 38 located between divided blocks 32 and 34 and pipe line 10 caused formation of proximity portion 36 at either end of heat transfer block 30. Intermediate member 38 forms surface contact with divided blocks 32 and 34. The pair of intermediate members 38, 38 face each other with small gap 37 therebetween. Further, a small gap 39 is formed between intermediate member 38 and pipe line 10. Small gap 37 is located between the pair of intermediate members 38, and small gap 39 is located between intermediate member 38 and pipe line 10. Therefore, the amount of heat transfer from first divided block 32 to second divided block 34 can be ensured without the contact of divided blocks 32 and 34 being impeded. Thus, heating is effected from the entire circumference of pipe line 10 to render the temperature isothermal.

Heat transfer block 30 is assembled around pipe line 10 such that first divided block 32 having intermediate member 38 formed integrally is brought into surface contact with second divided block 34 having another intermediate member 38 formed integrally. Thus, there is obtained a configuration in which divided blocks 32 and 34 form thermal contact with intermediate member 38 while the pair of intermediate members 38 face each other with small gap 37 therebetween, and intermediate member 38 faces pipe line 10 with small gap 39 therebetween.

Small gap 39 between intermediate member 38 and pipe line 10 is set small enough such that heat can be transferred sufficiently from heat transfer block 30 to pipe line 10 via intermediate member 38 at proximity portion 36. For the purpose of transferring heat more efficiently from heat transfer block 30 to pipe line 10, the dimension of small gap 39 is preferably as small as possible. As mentioned in the first embodiment, although a relatively large gap is formed between heat transfer block 30 and pipe line 10 at other regions excluding the region of proximity portion 36, the dimension of small gap 39 is smaller the dimension of the gap between heat transfer block 30 and pipe line 10 at other regions excluding the region of proximity portion 36.

For example, the dimension of small gap 39 is defined less than or equal to $1/10$, more preferably less than or equal to $1/30$ relative to the dimension of the gap between heat transfer block 30 and pipe line 10 at regions other than the region of proximity portion 36. Typically, the dimension of small gap 39 may be set to 0.1 mm when the gap dimension between heat transfer block 30 and pipe line 10 at regions other than the region of proximity portion 36 is 3 mm.

At heat transfer device 20 of the third embodiment having the configuration set forth above, proximity portion 36 is provided at both ends of heat transfer device 20, and heat is transferred from heat transfer block 30 to pipe line 10 via proximity portion 36. By setting the gap between pipe line 10 and heat transfer block 30 at proximity portion 36 as small as possible, the amount of heat transferred from heat transfer block 30 to pipe line 10 at the end face of heat transfer device 20 is increased. Accordingly, the heat dissipation from pipe line 10 at the joining portion of heat transfer device 20 and apparatuses 110 and 120 to the surrounding air as well as the heat transfer towards the side of apparatuses 110 and 120 through pipe line 10 can be compensated for, allowing temperature reduction of pipe line 10 at either end of heat transfer device 20 to be suppressed. Therefore, heat transfer device 20 can transfer the heat isothermally to pipe line 10 along the entire length, allowing the temperature to be controlled with high precision at the entirety of pipe line 10. The temperature uniformity can be improved along the entire length of pipe line 10.

Although small gap 39 is formed along the circumferential direction of pipe line 10 entirely in FIG. 7, pipe line 10 may be brought into contact with a portion of heat transfer block 30 while ensuring small gap 39 between heat transfer block 30 and pipe line 10 at proximity portion 36. As mentioned above, the temperature uniformity of pipe line 10 is ensured even if a portion of heat transfer block 30 is in contact with pipe line 10. Therefore, it is not necessary to critically define the arrangement of pipe line 10 relative to heat transfer block 30 at proximity portion 36. The contacting condition between heat transfer block 30 and pipe line 10 can be alleviated. Thus, the assembly of heat transfer device 20 can be improved, allowing reduction in the number of steps and cost in the assembling process.

Fourth Embodiment

Figure 9:
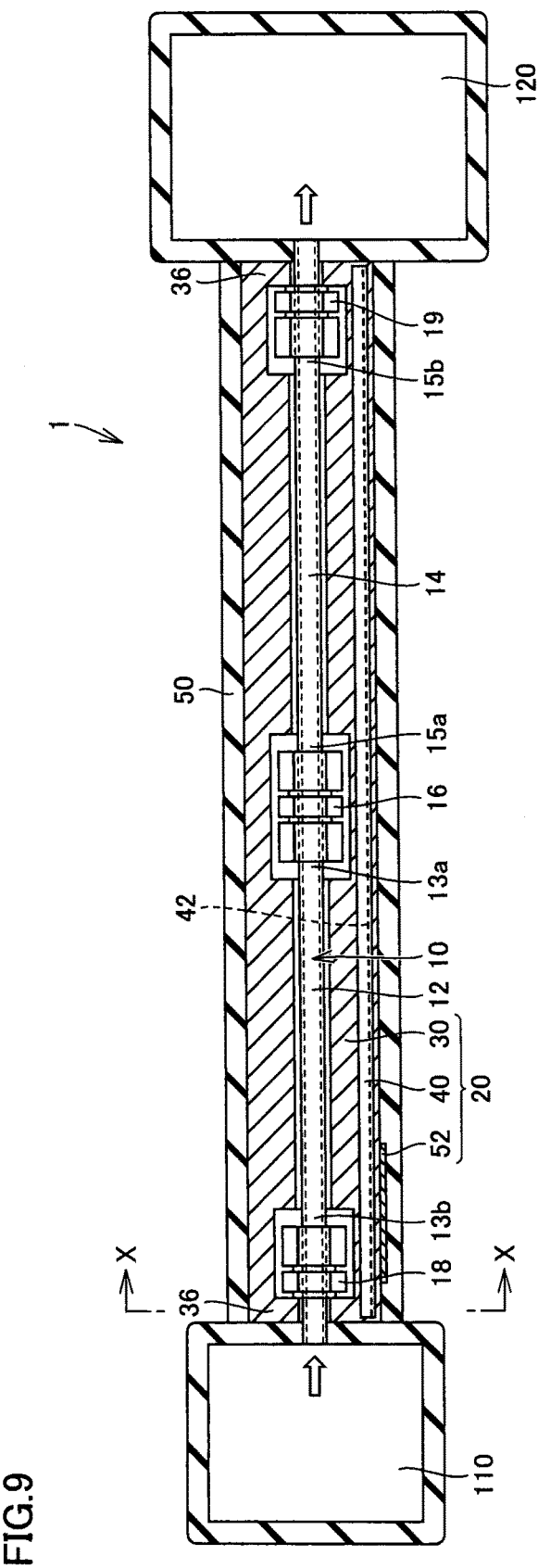
FIG. 9 is a schematic diagram representing a configuration of a heat transfer device according to a fourth embodiment.
Figure 10:
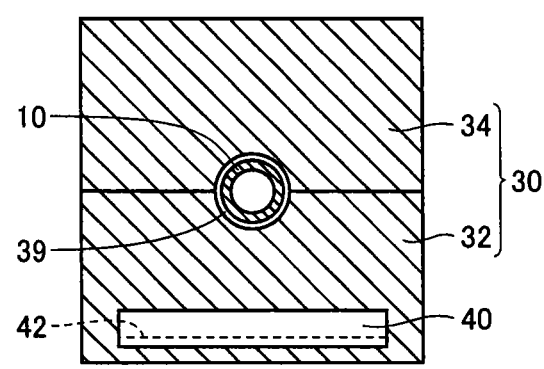
FIG. 10 is a sectional view of the heat transfer device taken along line X-X in FIG. 9.

FIG. 9 is a schematic diagram representing a configuration of heat transfer device 20 according to a fourth embodiment. FIG. 10 is a sectional view of heat transfer device 20 taken along line X-X in FIG. 9. Heat transfer device 20 of the fourth embodiment shown in FIGS. 9 and 10 is absent of intermediate member 38 between divided blocks 32, 34 and pipe line 10, likewise with the second embodiment. Proximity portion 36 is formed by reducing the inner diameter of divided blocks 32 and 34. At proximity portion 36, first divided block 32 and second divided block 34 form reliable surface contact while small gap 39 is provided between divided blocks 32, 34 and pipe line 10.

Accordingly, the absence of intermediate member 38 from the heat transfer path from heat transfer block 30 to pipe line 10 allows the thermal contact resistance to be reduced. Since the structure of heat transfer device 20 can be simplified by the absence of intermediate member 38, the cost can be reduced. Further, by reducing the number of heat pipes 40 to one, the cost can be further reduced. By ensuring heat transfer from first divided block 32 to second divided block 34 and setting the dimension of small gap 39 small enough such as about 0.1 mm, pipe line 10 can be heated sufficiently at proximity portion 36. The effect of rendering isothermal the temperature of pipe line 10 can be achieved in the same way.

Fifth Embodiment

Figure 11:
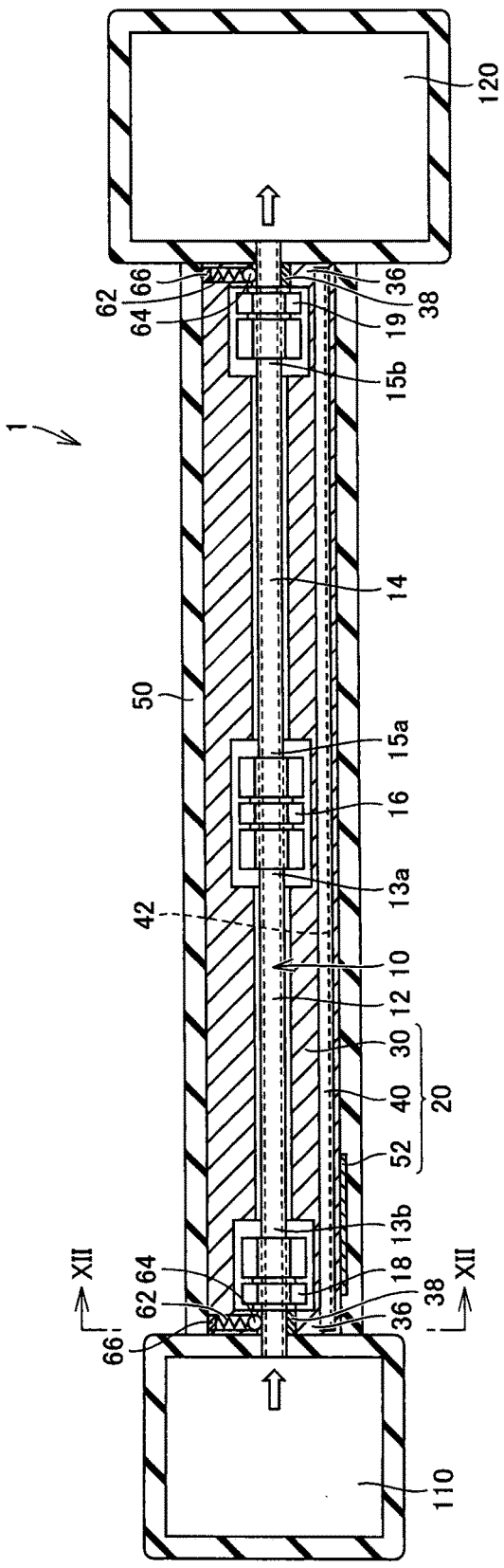
FIG. 11 is a schematic diagram representing a configuration of a heat transfer device according to a fifth embodiment.
Figure 12:
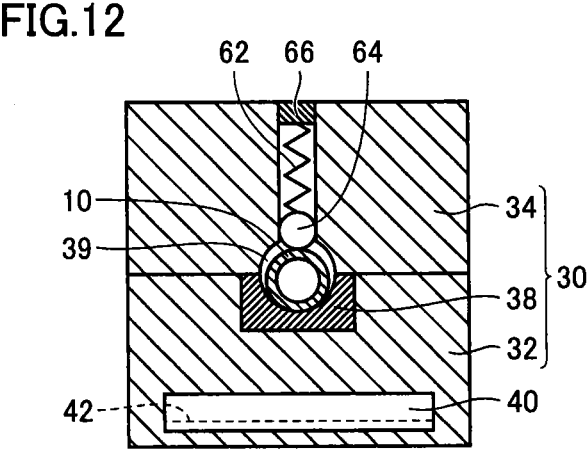
FIG. 12 is a sectional view of the heat transfer device taken along line XII-XII in FIG. 11.

FIG. 11 is a schematic diagram representing a configuration of heat transfer device 20 according to a fifth embodiment. FIG. 12 is a sectional view of heat transfer device 20 taken along line XII-XII in FIG. 11. Heat transfer device 20 of the fifth embodiment includes a spring 62 as an example of a biasing member pushing pipe line 10 towards the side of first divided block 32 at proximity portion 36. Second divided block 34 has a through hole formed in the thickness direction of second divided block 34, and spring 62 is arranged in the through hole. Intermediate member 38 is provided between first divided block 32 and pipe line 10, while small gap 39 is formed without an intermediate member between second divided block 34 and pipe line 10.

A sphere 64 is attached at the leading end of spring 62. The other end of spring 62 is connected to a fixture 66. Sphere 64 is in contact with the outer circumferential face of pipe line 10, so that the elastic force of spring 62 is conveyed to pipe line 10 via sphere 64. Fixture 66 is secured to second divided block 34. Spring 62 and sphere 64 are attached to second divided block 34 through fixture 66.

When first divided block 32 and second divided block 34 are assembled, spring 62 is compressed to be deformed so as to be reduced in length. The elastic force generated by this compression of spring 62 is conveyed to pipe line 10 via sphere 64. Accordingly, pipe line 10 is pushed towards the side of first divided block 32. Sphere 64 attached at the leading end of spring 62 smoothly abuts against the outer circumferential face of pipe line 10. The provision of sphere 64 allows pipe line 10 to be pushed stably towards the side of first divided block 32 regardless of the rolling of pipe line 10 in the circumferential direction.

By intentionally pushing pipe line 10 against heat transfer block 30 by means of spring 62, the relative arrangement of pipe line 10 to heat transfer block 30 can be set constant. As a result, the heat transferred from heat transfer block 30 to pipe line 10 at proximity portion 36 can be rendered stable. By pushing pipe line 10 toward the side of first divided block 32 in which heat pipe 40 is formed, heat can be transferred to pipe line 10 more reliably.

Spring 62 may be formed of an arbitrary shape and material. Alternative to spring 62, an arbitrary member that can generate elastic force working to push pipe line 10 toward the side of first divided block 32 may be applied as a biasing member.

Sixth Embodiment

Figure 13:
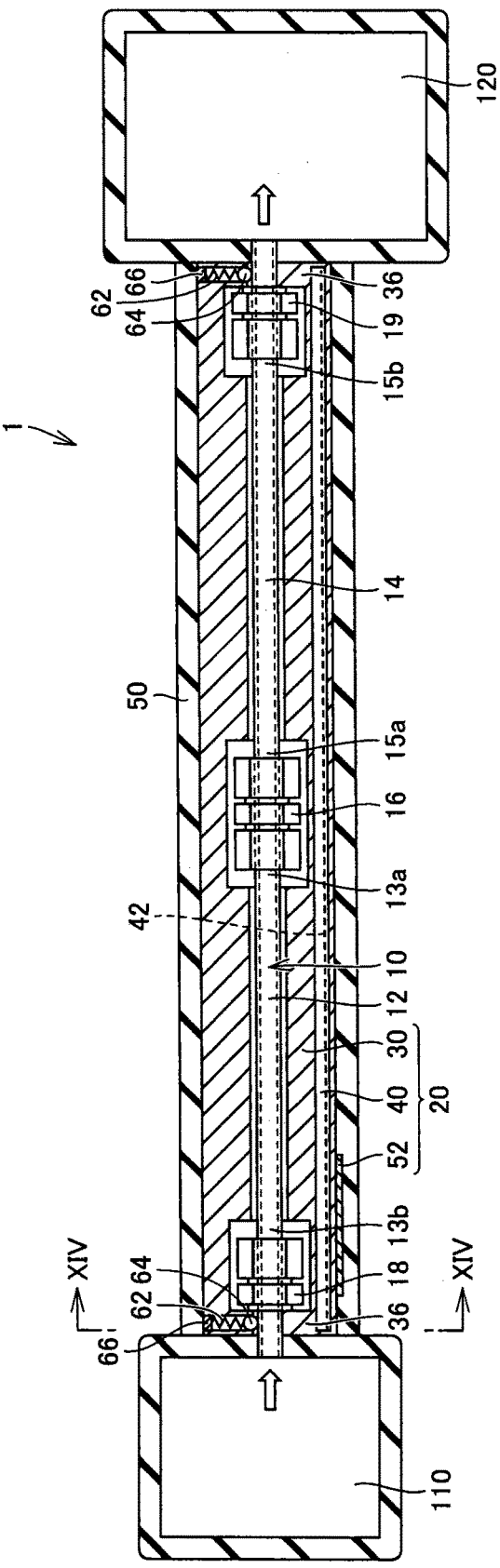
FIG. 13 is a schematic diagram representing a configuration of a heat transfer device according to a sixth embodiment.
Figure 14:
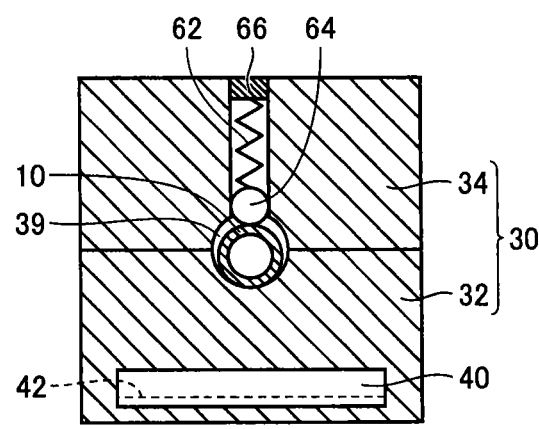
FIG. 14 is a sectional view of the heat transfer device taken along line XIV-XIV in FIG. 13.

FIG. 13 is a schematic diagram representing a configuration of heat transfer device 20 according to a sixth embodiment. FIG. 14 is a sectional view of heat transfer device 20 taken along line XIV-XIV in FIG. 13. Heat transfer device 20 of the sixth embodiment includes a spring 62, likewise with the fifth embodiment. An intermediate member is not provided between first divided block 32 and pipe line 10. By the reduction of the inner diameter of first divided block 32 and causing pipe line 10 to be pushed toward the side of first divided block 32 by means of the elastic force of spring 62, pipe line 10 is brought into contact with first divided block 32.

Accordingly, likewise with the fifth embodiment, the arrangement of pipe line 10 relative to heat transfer block 30 can be set constant to allow the amount of heat transferred from heat transfer block 30 to pipe line 10 at proximity portion 36 to be rendered stable. Moreover, the elimination of an intermediate member allows the thermal contact resistance and cost to be reduced.

Although the present invention has been described based on the foregoing embodiments, it is intended that the features of the embodiments may be combined appropriately. Furthermore, it should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The heat transfer device of the present invention is advantageously applied to a heat transfer device that transfers heat to a pipe line of a fluid conveying device conveying a substance that requires temperature control with high precision such as reaction gas supplied in forming a film of a target material for a semiconductor wafer, a liquid crystal glass substrate, or the like.

REFERENCE SIGNS LIST 1 fluid conveying device; 10 pipe line; 20 heat transfer device; 30 heat transfer block; 32 first divided block; 33,37,39 small gap; 34 second divided block; 36 proximity portion; 38 intermediate member; 40 heat pipe; 50 heat insulating material; 52 heater; 62 spring: 64 sphere; 66 fixture; 110, 120 apparatus.

The invention claimed is:
1. A heat transfer device transferring heat to a pipe line in which a fluid flows, comprising:
   a heat transfer block of high heat conductivity, surrounding said pipe line,
   a heat pipe formed in said heat transfer block, along an extending direction of said pipe line, and
   a heater applying heat to said heat pipe,
   said heat transfer block including a plurality of divided blocks dividable along the extending direction of said pipe line, a proximity portion where said heat transfer block is in proximity to said pipe line being provided at both ends of said heat transfer block in the extending direction of said pipe line.

2. The heat transfer device according to claim 1, wherein an extending length of said proximity portion in the extending direction of said pipe line is less than or equal to an outer diameter of said pipe line at said proximity portion.

3. The heat transfer device according to claim 1, wherein said heat transfer block includes a first divided block and a second divided block,
said heat pipe is formed at only said first divided block, among the plurality of divided blocks,
said first divided block and said second divided block are in surface contact.

4. The heat transfer device according to claim 3, wherein said heat transfer block includes an intermediate member between said divided block and said pipe line, at said proximity portion,
said intermediate member is in thermal contact with said divided block.

5. The heat transfer device according to claim 4, wherein a small gap is provided between said intermediate member and said pipe line.

6. The heat transfer device according to claim 3, wherein said proximity portion is formed by reducing an inner diameter of said divided block at said proximity portion.

7. The heat transfer device according to claim 6, wherein a small gap is provided between said divided block and said pipe line at said proximity portion.

8. The heat transfer device according to claim 3, comprising a biasing member pushing said pipe line at said proximity portion towards said first divided block side.

9. The heat transfer device according to claim 8, comprising a sphere attached to a leading end of said biasing member,
said sphere being in contact with an outer circumferential face of said pipe line.

10. The heat transfer device according to claim 1, wherein said heat transfer block includes a first divided block and a second divided block,
said first divided block facing said second divided block with a small gap therebetween.

11. The heat transfer device according to claim 10, wherein said heat transfer block includes an intermediate member between said divided block and said pipe line, at said proximity portion,
said intermediate member being in thermal contact with said divided block.

12. The heat transfer device according to claim 11, wherein said intermediate member is in contact with said pipe line.

13. The heat transfer device according to claim 10, wherein said proximity portion is formed by reducing an inner diameter of said divided block at said proximity portion.

14. The heat transfer device according to claim 13, wherein said divided block is in contact with said pipe line at said proximity portion.

* * * * *